H. W. VITT.

Improvement in Bush for Mill Spindles.

No. 118,077.            Patented August 15, 1871.

Witnesses:
Chas. Nida
Francis McArdle

Inventor:
H. W. Vitt,
per Munn & Co.
Attorneys.

118,077

UNITED STATES PATENT OFFICE.

HERMAN W. VITT, OF UNION, MISSOURI.

IMPROVEMENT IN BUSHES FOR MILL-SPINDLES.

Specification forming part of Letters Patent No. 118,077, dated August 15, 1871.

*To all whom it may concern:*

Be it known that I, HERMAN W. VITT, of Union, in the county of Franklin and State of Missouri, have invented a new and useful Improvement in Bush for Mill-Spindles, &c.; and I do hereby declare that the following is a full, clear, and exact description thereof, which will enable others skilled in the art to make and use the same, reference being had to the accompanying drawing forming part of this specification, in which—

Figure 1:
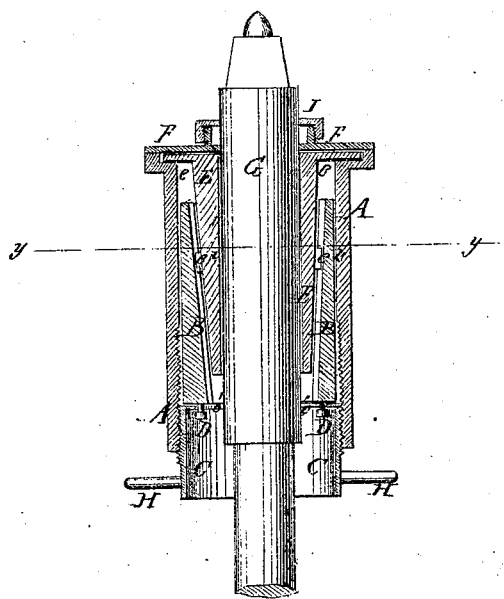
Figure 2:
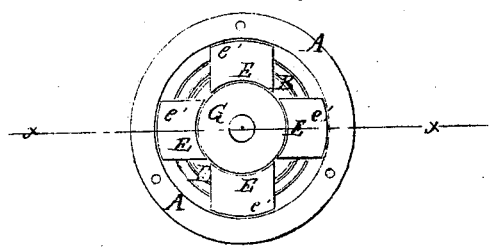
Figure 3:
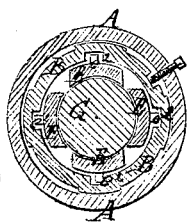

Figure 1 is a vertical longitudinal section of my improved bush taken through the line $x\ x$, Fig. 2. Fig. 2 is a top view of the same, the top plate being removed. Fig. 3 is detail horizontal section of the same taken through the line $y\ y$, Fig. 1.

Similar letters of reference indicate corresponding parts.

My invention has for its object to furnish an improved bush for mill-spindles and other vertical shafting, which shall be simple in construction, easily and conveniently operated, whether the spindle or shaft be running or not, will not get the spindle out of tram, and which will exactly center the spindle, it being impossible to move one of the followers without moving them all; and it consists in the combination of parts by which the followers are all moved together, as hereinafter more fully described.

A is the outer case, which is made with a straight bore, and within which is accurately fitted a tubular ring, B. The outer face or surface of the tube B may be partly cut away, as shown in Fig. 3, to diminish friction. The outer surface of the tube B is made straight and its inner surface tapering, as shown in Fig. 1. C is a tubular ring, upon the outer surface of the upper part of which is formed a screw-thread, which fits into a screw-thread formed in the inner surface of the lower part of the casing A, as shown in Fig. 1. The upper end of the tube C has an inwardly-projecting flange, $c'$, formed upon it, which is overlapped by the heads of screws D, screwed into tl e lower edge of the tube B, as shown in Fig. 1, so that the said tube B may be moved up and down by turning the tube C in one or the other direction. E are the followers, the outer sides of which are made tapering, as shown in Fig. 1, to correspond with the taper of the inner surface of the tube B. Upon the outer sides of the upper ends of the followers E are formed flanges $e^1$, which fit loosely upon a shoulder or rabbet formed in the inner edge of the upper end of the case A, where they are secured in place by the cap-plate F, secured to the upper end of the said case A, and through a hole in the center of which the spindle G passes. By this construction the followers may be moved freely toward or from the spindle G, but cannot be moved longitudinally. The followers E are kept from being revolved by the revolution of the spindle G by projections $e^2$, formed upon their outer sides, and which enter longitudinal grooves in the inner surface of the tube B. The tube B is kept from being revolved by the follower E, by set-screws $a'$ passing through or projections formed upon the walls of the case A, and which enter longitudinal grooves in the outer surface of the case A, as shown in Fig. 3. The tube C may be turned to adjust the tube B and follower E by arms H or other means attached or applied to the lower part of the said tube C. I is a stuffing-box connected with the plate F, and through which the spindle G passes to prevent dust from finding its way to the bearings.

Having thus described my invention, I claim as new and desire to secure by Letters Patent—

1. The screw-tube C $c'$ and tapering tube B, in combination with the case A and tapering followers E, to move said followers simultaneously toward or from the spindle, substantially as herein shown and described.

2. The flanges $e^1$ and projections $e^2$ formed upon the tapering followers E to adapt them for use with the case A and tapering tube B, substantially as herein shown and described and for the purpose set forth.

HERMAN W. VITT.

Witnesses:
ROBERT C. CROW,
F. W. REINHARD.